July 30, 1957 W. F. SCHMIED 2,800,758
HARROW-HITCH ATTACHMENT FOR TRACTORS
Filed April 20, 1954 3 Sheets-Sheet 1

Inventor
William F. Schmied
Paul O. Pippel
Atty.

July 30, 1957 W. F. SCHMIED 2,800,758
HARROW-HITCH ATTACHMENT FOR TRACTORS
Filed April 20, 1954 3 Sheets-Sheet 2
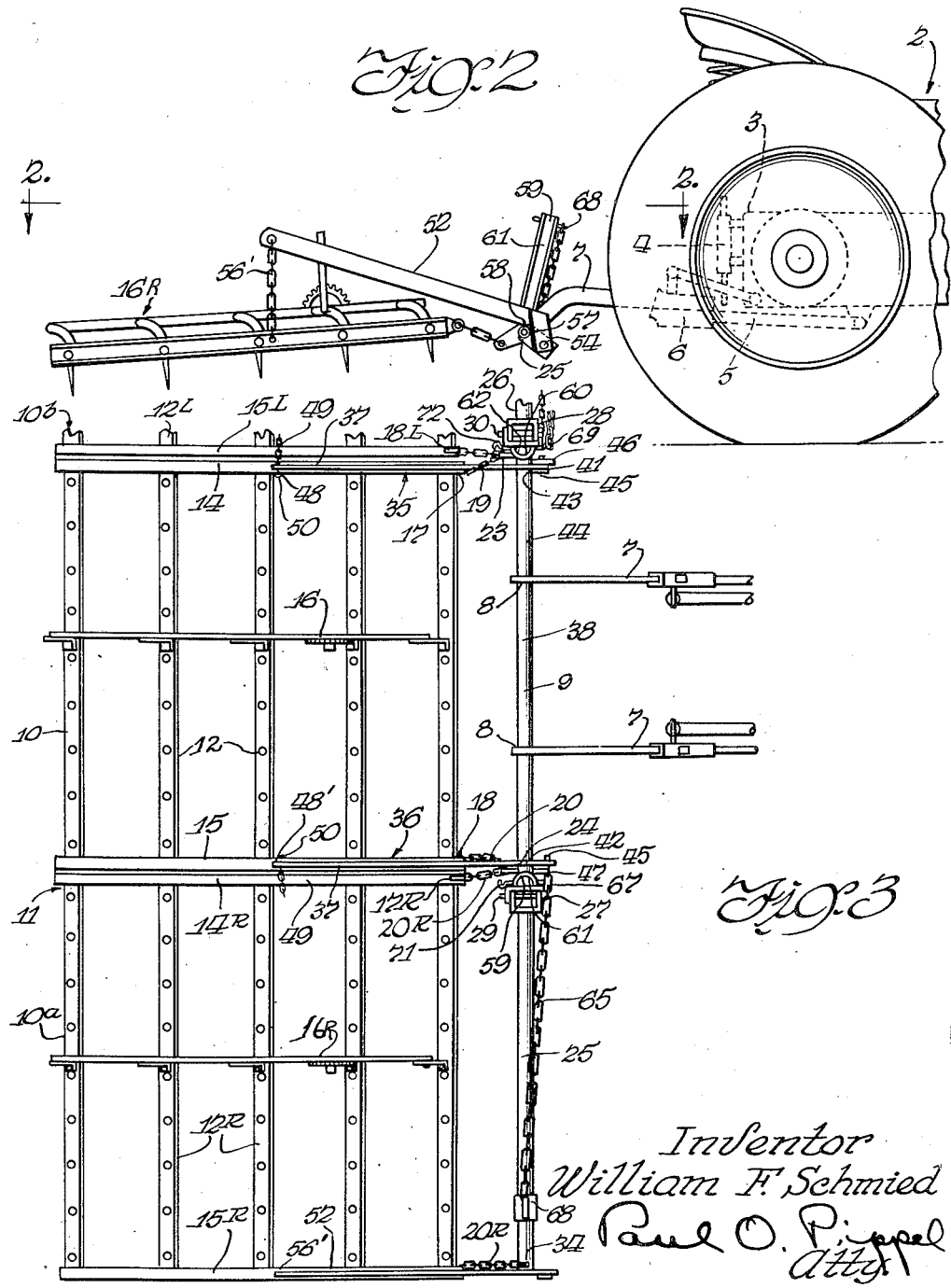
Inventor
William F. Schmied
Paul O. Pippel
Atty

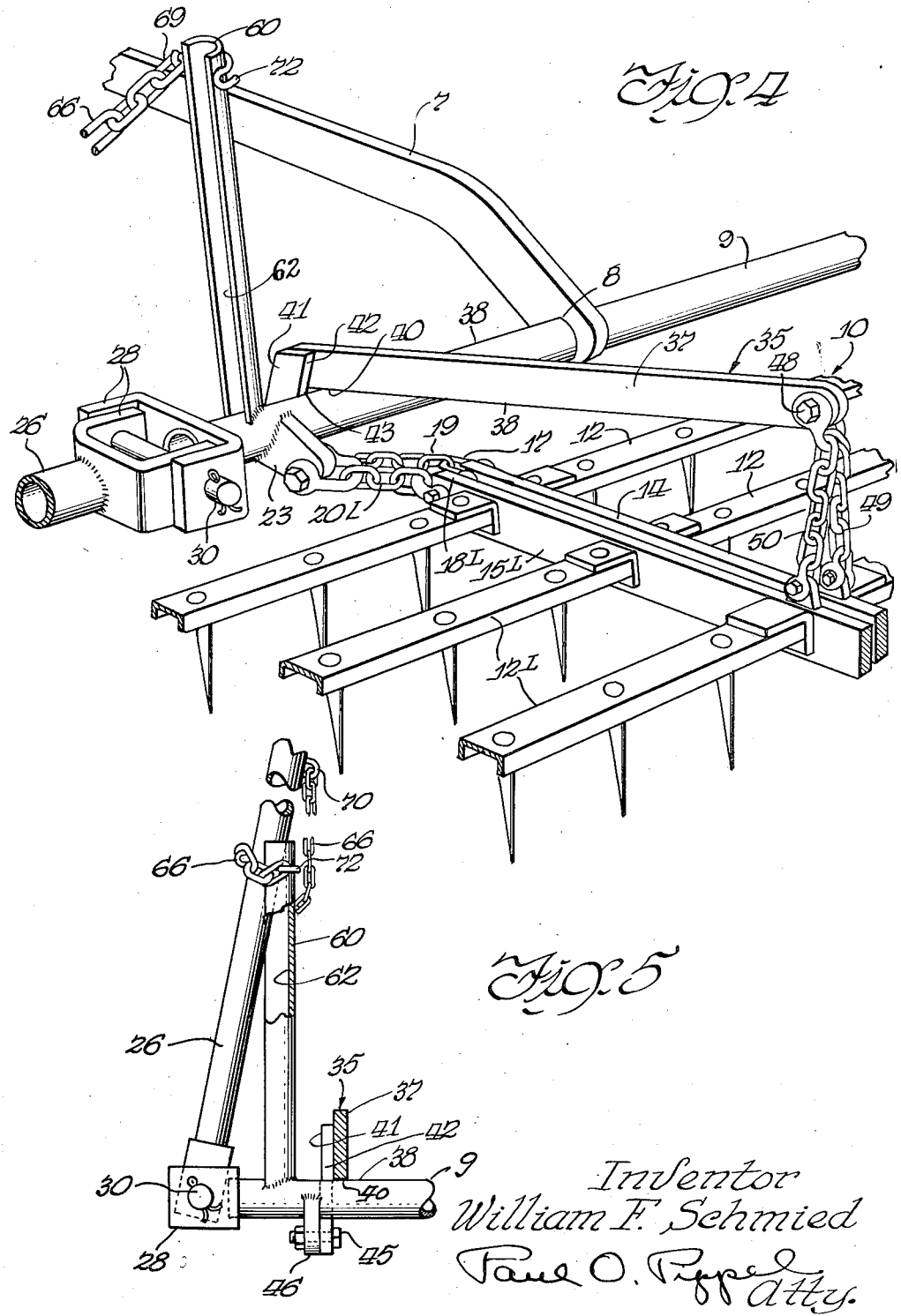

United States Patent Office 2,800,758
Patented July 30, 1957

2,800,758

HARROW-HITCH ATTACHMENT FOR TRACTORS

William F. Schmied, Blue Island, Ill., assignor to International Harvester Company, a corporation of New Jersey Application April 20, 1954, Serial No. 424,319

4 Claims. (Cl. 55—88)

This invention relates to a harrow lift and draft attachment for a tractor, and more particularly to a harrow-hitch for the hydraulic lift-mechanism of a tractor.

A principal object of the invention is to provide an attachment of the character disclosed, wherein a harrow of a single or a plural frame type is suspended from a lift assembly which is hydraulically controlled from the tractor.

A more specific object of the invention is the provision of a novel support framework for a multiple frame harrow wherein the frames are adapted to be folded into a narrow unit and wherein parts of the framework supporting the harrow in operating position are utilized to support the folded frames in folded position.

These and other objects of the invention will become more apparent from the specification and drawings wherein:

Figure 2 is a side elevational view of the assembly shown in Figure 1 with the tractor fragmentarily shown and the harrow shown in open elevated position;

Figure 3 is a fragmentary plan view on line 2—2 of Figure 2 of the multiple section harrow in operating position and the draft-suspension frame associated therewith;

Figure 4 is a fragmentary enlarged perspective view of the draft-suspension frame shown in association with portions of the harrow; and Figure 5 is a fragmentary enlarged rear elevational view of a portion of the draft-suspension frame with portions shown in vertical section.

Figure 1:
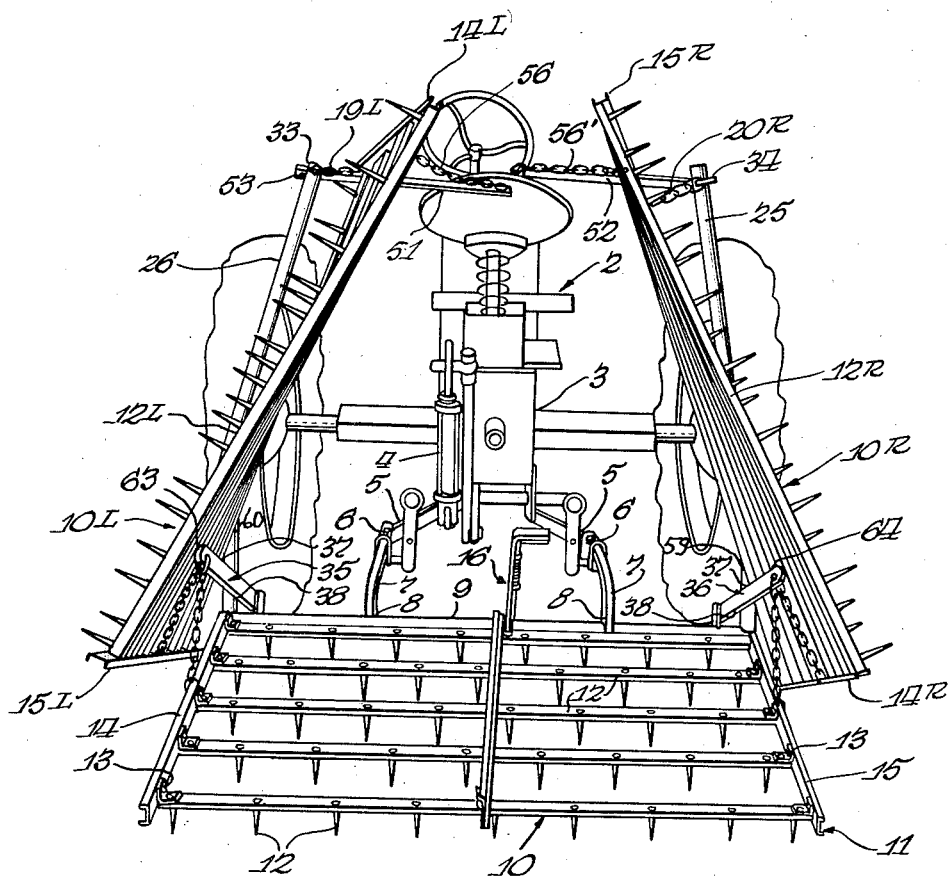
Figure 1 is a rear perspective view of a tractor with the multiple section harrow shown in folded position on the novel suspension draft frame, parts being omitted to simplify the illustration.

Referring to the drawings, the tractor or power draft unit generally designated 2 is provided at its aft portion 3 with a conventional hydraulic lift mechanism 4 of the type shown and more clearly described in co-pending U. S. application of John R. Orelind, Serial No. 338,652, filed February 25, 1953, for Implement Attaching Structure for Tractors and comprises a pair of rearwardly extending hydraulically operated hitch members 5, the rear ends of which are provided with rearwardly open sockets 6 receiving the forward ends of fore-and-aft extending draft tongues or elements 7 which are spaced apart laterally on the order of the draw frame members 5, the sockets 6 and the forward ends of the member 7 being provided with cooperative interlocks as can be readily understood by reference to the aforesaid application.

The rear ends of the draft member 7 are connected at laterally spaced points as at 8 to a transverse beam member 9, which member is of a length slightly in excess of the width of the center section 10 of the harrow implement generally indicated 11, said implement being of conventional design and including a plurality of parallel toothed cross bars 12, the cross bars 12 pivotally mounting at opposite ends as at 13 on fore-and-aft extending side members 14 and 15 which together form a planar frame. The members 12 are associated with a tilting mechanism 16 of the type shown in U. S. Patent 1,109,436 which also illustrates the general construction of the harrow.

The forward ends of the side beam members 14, 15 of the center section 10 are provided respectively with eye portions 17 and 18, which are connected respectively to the rear ends of flexible chain linkages 19 and 20, the forward ends of which are hooked to eyes or lugs 23 and 24 on the adjacent ends of the center beam member 9, the chains 19 and 20 thus forming a flexible connection between the harrow section 10 and the beam 9.

The beam member 9 is provided with right and left hand beam extension elements 25 and 26 and the adjacent ends of these extensions and the respective ends of the beam member 9 are provided with hinge connections 27 and 28 with generally fore-and-aft extending axes of pivot defined by the pins 29 and 30 which pass through the complementary hinge portions of the hinges 27 and 28.

Inasmuch as the three harrow sections shown are substantially identical, the same parts are identified by corresponding numerals except for the addition of the suffix R or L to designate the right or left section. The harrows section 10L and 10R are located respectively to the right and left of the center section 10. The side beam 15L and 14R of the sections 10L and 10R have their forward ends 18L and 17R connected respectively to chain links 20L, 19R which, at their forward ends, are connected to the eyes 23 and 24.

The beam members 14L and 15R are connected by flexible linkage 19L and 20R to the outer ends of members 26 and 25 respectively as at 33 and 34 (Figure 1).

The center beam 9 is provided adjacent to each end with a pair of rearwardly extending support elements or arm means 35 and 36, each L-shaped in side elevation and each comprising a fore-and-aft extending arm or leg portion 37 which overlies and projects rearwardly from the beam member 9, the portion 37 having a lower edge or side 38 which at the forward end of portion 37 overlies the top edge 38 of the beam member 9 and seats thereupon as at 40. The forward end of the portion 37 connects to the upper end of an upright leg or extension portion 41 of the related elements which has a rear edge 42 seated as at 43 against the forward side 44 of the beam member 9. The lower end of portion 41 is pivoted on a pin 45 extending generally parallel to bar 9 and providing an axis of pivot the pin 45 of member 35 associated and pivoted on a bracket 46 and pin 45 of member 36 pivoted on a similar bracket 47, the brackets 46 and 47 being connected to the forward and bottom sides of the ends of beam 9. Downward pivotal movement of the support elements 35 and 36 is limited but upward pivoting is unrestricted. The rear ends of the arm portions 37 of members 35 and 36 are connected respectively at 48 and 48' to upper ends of flexible chains or elements 49 and 50. The chains 49 and 50 of the right-hand member 36 connect at their lower ends with members 14R, 15 intermediate their ends and the chains 49 and 50 of the left-hand member 36 connect at their lower ends with members 15L, 14 intermediate their ends.

The outer ends of the extension 25 and 26 are provided with support arms 51 and 52 which are identical with arms 35 and 36 and are pivotally connected at 53 and 54, respectively, to the respective ends of the members 25 and 26 on axes generally lengthwise of the respective members 25 and 26, and these arms 51 and 52 also seat on the forward and top sides of the related beam. The members 51 and 52 extend rearwardly, the rear end of member 51 being connected by a flexible chain 56 (Fig. 1) to the member 14L of the harrow section 10L intermediate the ends thereof and the rear end of member 52 being connected by a flexible chain 56' to the side beam 15R of the harrow section 10R. It will be seen from a consideration of Figure 2 that the member 52 seats as at 57 and 58 against the forward and top sides of the beam 25. Member 51 seats similarly against member 26.

The center beam 9 is provided at opposite ends with integral upstanding posts 59 and 60 of channel-shape and providing outwardly opening cavities 61 and 62 respectively in alignment with the beam extensions 25 and 26 for pocketing the same intermediate their ends in the folded upright positions of the sections 10R and 10L as seen in Figure 1 whereat it will be noted that the support member 35 has the outer side of its portion 37 in abutment as at 63 with the lower part of harrow section 10L and similarly the member 36 has its portion 37 in abutment as at 64 with the lower portion of the harrow section 10R. This feature prevents these sections from flapping loosely in transport. It will also be noted from Figure 1 that the upper extremities of the sections 10R and 10L are accommodated inwardly to form a pyramidal arrangement tending to keep the harrow folded. This inward deflection of the upper ends of sections 10R and 10L is accommodated by the support arms 51 and 52 pivoting inwardly away from the respective sections.

Referring now to Figures 2, 3 and 5 it will be observed that in operating position the beam members 25 and 26 are held in alignment with section 9 by means of chains 65 and 66, the chain 65 connected at one end at 67 to the upper end of post 59 and at the other end at 68 to the beam member 25 adjacent to its outer end. The chain 66 is connected at one end at 69 to the upper end of post 60 and at its other end to the outer end of beam member 26 as at 70 (Figure 5). The chain 65 is adapted to be looped about the beam 25 and hooked about a hook 71 on post 59 in the folded position of section 10R and chain 66 is adapted to be looped about the member 26 and hooked to hook 72 on post 60 as best seen in Figure 5 in order to secure the side sections in folded position.

What is claimed is:

1. An attachment for a power draft unit having a vertically swingable lift for a ground working implement comprising a frame adapted for connection to said lift and including a transverse generally horizontal beam member having top, forward end rear sides with the forward side oriented to face said draft unit, fore and aft extending arm means overlying said top side of the beam member and projecting rearwardly of the beam member, said arm means having forward end portions projecting forwardly of the front side of said beam member, cooperative means on said front end portions of said arm means and said beam member pivotally connecting said arm means with said beam member on axes located ahead of said front side of said beam meber and generally parallel thereto for vertical pivotal movement of said arm means, said arm means having bottom sides abuttable with the top side of said beam member to limit downward pivotal movement, implement support means connected to said arm means rearwardly of said beam member, implement-connecting draft means connected to said beam member, beam extension members at opposite ends of said beam member and pivoted thereto on fore and aft extending axes, implement means connected to said extension members, said extension members and the implement means associated therewith adapted to be folded upright, and said arm means positioned in supporting relation to said implement means associated with said extension members in the folded position thereof.

2. An implement comprising a harrow having two side sections and a center section disposed in transverse alignment in operating position and each section comprising a planar frame, a transverse beam member positioned ahead of said center section substantially in fore and aft alignment therewith, beam extension elements at opposite ends of said beam member and pivotally connected thereto on generally fore and aft axes and positioned ahead of respective side sections, flexible means connecting said center and side sections to said beam member and other flexible means connecting said side sections to adjacent beam extension elements, laterally spaced arms extending over said beam member and having forward end portions projecting forwardly of said beam member and pivoted thereto on axes located ahead of the beam member generally parallel thereto, said arms extending diagonally upwardly and rearwardly of said beam member over said center section and having bottom sides seated against said beam member in the lowermost position of said arms, flexible means connecting the frame of said center section with said arms, said side sections adapted to be folded upright with attendant upward pivoting of said beam extension elements about said axes of connection thereof with said beam member, said arms positioned adjacent to the lateral extremes of said center section thereabove at a distance less than the width dimension of the said side sections and each arm laterally abuttable with the adjacent side section to support the same with an upward and inward inclination in the folded position thereof.

3. The combination according to claim 2 and said beam member having upstanding posts adjacent to opposite ends and each post having an outwardly open channel disposed in the plane of pivot of the adjacent beam extension element and adapted to receive the same in the folded position thereof.

4. The combination according to claim 3 and chain means connected to each post and to the related element and forming a triangular suspension therewith in the operating position of said harrow, and hooks on said posts adapted for hooking engagement with links of said last mentioned chains for securing the side sections in folded position.

References Cited in the file of this patent

UNITED STATES PATENTS

| | | |
|---|---|---|
| 897,905 | Kinkade | Sept. 8, 1908 |
| 1,535,058 | Taylor | Apr. 21, 1925 |
| 2,522,011 | Young | Sept. 12, 1950 |
| 2,591,028 | Udy | Apr. 1, 1952 |
| 2,665,622 | Bunting | Jan. 12, 1954 |